R. E. ADREON.
INTERCHANGE COUPLING DEVICE.
APPLICATION FILED JUNE 26, 1908.

950,812.

Patented Mar. 1, 1910.
2 SHEETS—SHEET 1.

WITNESSES
Wm. M. Cady
J. S. Custer

INVENTOR
Robert E. Adreon
By E. A. Wright
Att'y.

R. E. ADREON.
INTERCHANGE COUPLING DEVICE.
APPLICATION FILED JUNE 26, 1908.
950,812.
Patented Mar. 1, 1910.
2 SHEETS—SHEET 2.
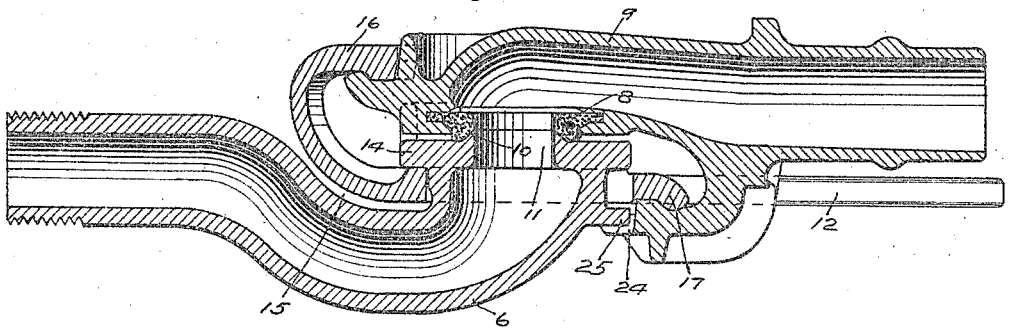
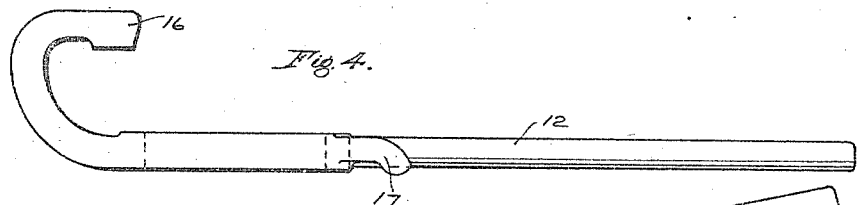
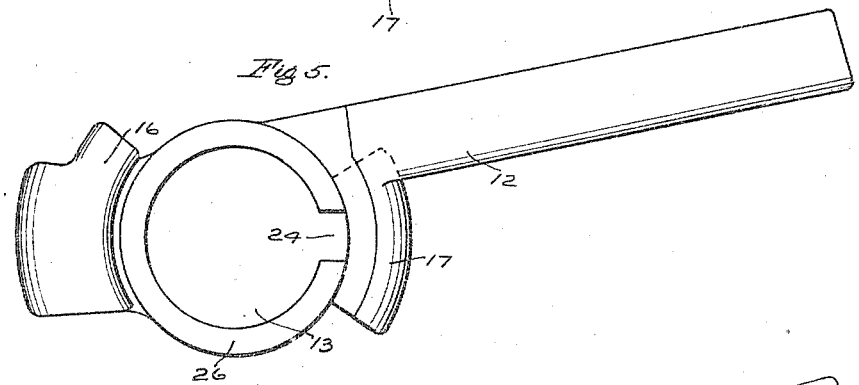
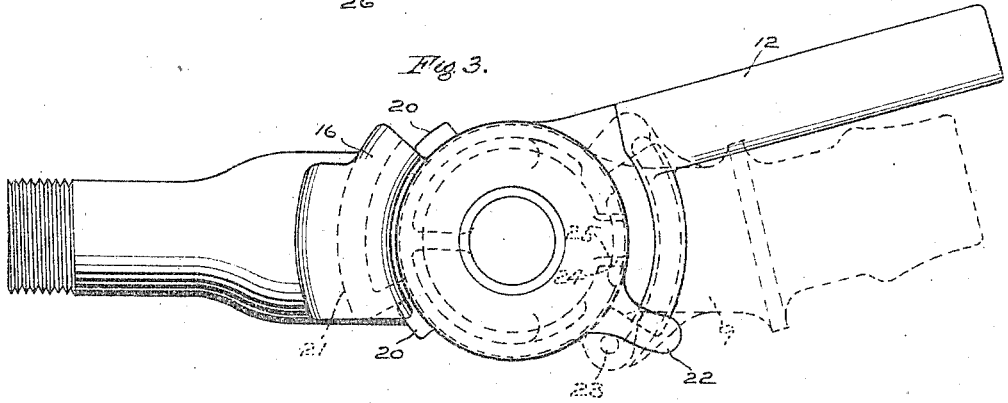
WITNESSES
Wm. M. Cady
J. S. Custer
INVENTOR
Robert E. Adreon
by E. Wright
Att'y.

UNITED STATES PATENT OFFICE.

ROBERT E. ADREON, OF ST. LOUIS, MISSOURI, ASSIGNOR TO WESTINGHOUSE AUTOMATIC AIR & STEAM COUPLER COMPANY, OF ST. LOUIS, MISSOURI, A CORPORATION OF ILLINOIS.

INTERCHANGE COUPLING DEVICE.

950,812.  Specification of Letters Patent.  Patented Mar. 1, 1910.

Application filed June 26, 1908. Serial No. 440,604.

*To all whom it may concern:*

Be it known that I, ROBERT E. ADREON, a citizen of the United States, residing at St. Louis, in the State of Missouri, have invented new and useful Improvements in Interchange Coupling Devices, of which the following is a specification.

This invention relates to automatic pipe couplings, and more particularly to an interchange coupling device for coupling up air, steam and other train pipes, on a car equipped with automatic pipe couplings, to corresponding pipes on a car not so equipped.

The main object of my invention is to provide an improved construction of the above character, which may be readily and quickly manipulated to couple and uncouple the automatic pipe coupling on the car to and from the usual hand operated pipe coupling, and further to provide a device adapted to effect a tight coupling joint.

Figure 1:
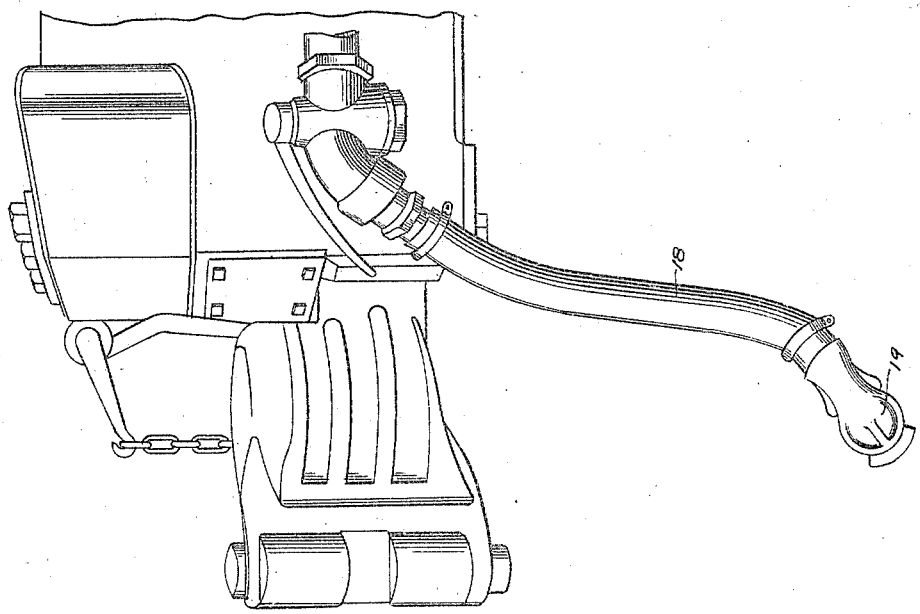
Figure 1:
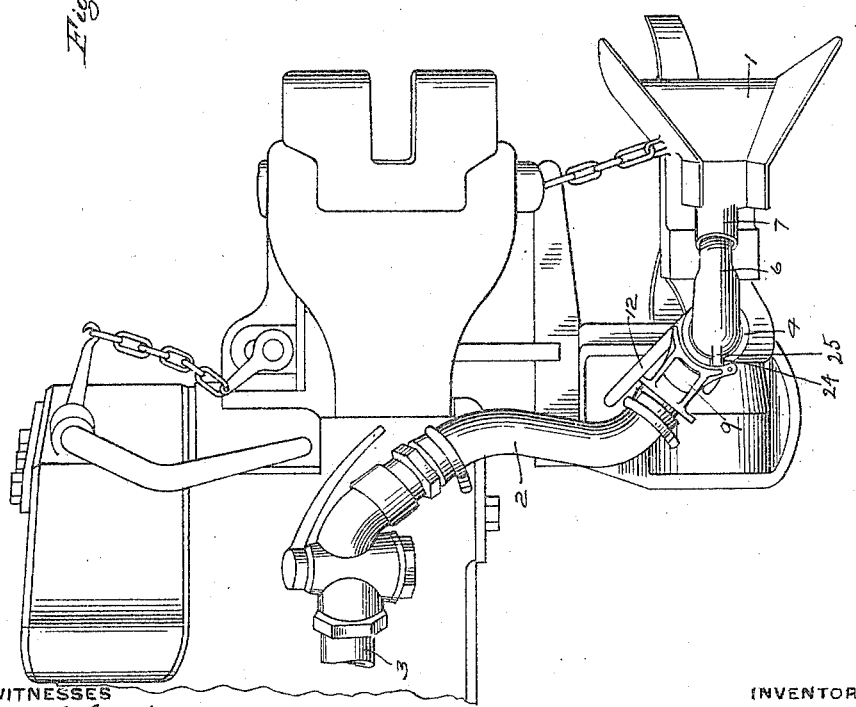

In the accompanying drawing; Figure 1 is a side elevation of the end portions of two adjacent cars in position for coupling, one car being shown equipped with an automatic pipe coupling and having my invention applied thereto, and the other car being provided with the usual flexible hose connection attached to a hand operated pipe coupling half section; Fig. 2 a central sectional view of the improved interchange coupling device, coupled to a hand operated pipe coupling; Fig. 3 a side view of the construction illustrated in Fig. 2; Fig. 4 a detail side view of the hand lever device for operating same; and Fig. 5 a plan view of said lever device.

In Fig. 1 of the drawings an automatic pipe coupling half section 1, of the side port type is shown applied to one car, and the same is connected by the interchange coupling device 4 with an ordinary hand operated coupling half section 9, attached to the flexible hose 2 leading to the train pipe 3.

According to a preferred construction of the interchange coupling device, as illustrated in Figs. 2 to 5 inclusive, a pipe section 6 is provided, which is screwed into the nozzle 7 of the automatic coupling head 1. The pipe section 6 has a seat on which the gasket 8 of the hand coupling half section 9 is adapted to engage and the same is preferably provided with a raised lip portion 10 around the passage-way 11 for pressing into the gasket 8 in coupling to assist in making a tight joint. A locking lever device 12 is provided, having a central opening 13, whereby the same may be slipped over the pipe end of the pipe section 6 and brought into engagement with the under side of a peripheral flange 14 on the pipe section 6, adjacent to the seat, the section 6 being offset as shown at 15, to allow clearance space for the rotative movement of the lever device. The hand lever device 12 is provided with locking or clamping flanges 16 and 17, similar to the locking flanges of an ordinary hand operated pipe coupling half section, for engagement in the usual way with flanges of a hand operated coupling half section. In the upright position of the handle 12, the hand coupling section 9 may be applied to the seat on the interchange coupling device and by rotating the handle, the respective flanges 16 and 17 of the handle device are brought into clamping engagement with the flanges of the coupling half section, so that the gasket is pressed to a tight joint on its seat. A coupling connection may thus be quickly made by the single movement of the hand lever 12, and the parts may be as readily disconnected, when it is desired to couple up with a car not provided with an automatic pipe coupling mechanism, such as the flexible hose 18 having an ordinary hand coupling half section 19, as shown in Fig. 1 attached to the adjacent car.

In order to prevent possible rotative movement of the hand coupling half section 9 on the seat of the interchange coupling device, while the handle 12 is being turned to lock the parts together, I preferably provide projecting lugs 20 on the pipe section 6, in position to engage opposite sides of the flange 21 on the hand coupling half section 9. A lug 22 may also be provided on the side of the interchange coupling device opposite the lugs 20, adapted to engage between the usual pin 23 and the body of the hand coupling half section, to further assist in holding and guiding the parts in proper position for coupling.

When the interchange coupling handle 12 is not in use, the same might jar back from its normal position to the rearward part of the pipe section 6, and in order to avoid this, I may provide a lug 25 adapted to ride over the ring portion 26 of the handle so that the handle can not slip back on the pipe section, and in order to permit of assembling the handle on the pipe section 6, a notch 24 is provided in the ring portion 26, whereby in one position of the handle, preferably the locking position, the lug 25 registers with the notch 24, so that the handle device may be applied or removed, as will be apparent. By the above means the gasket 8 is evenly clamped so as to insure a tight joint, while the parts are simple and easily and quickly manipulated.

Having now described my invention, what I claim as new and desire to secure by Letters Patent, is:—

1. An interchange coupling device comprising a pipe section provided with a seat for engaging the gasket of a hand operated pipe coupling half section and a manually operated lever provided with locking flanges adapted to engage the locking flanges of the hand operated coupling half section to couple the parts together.

2. An interchange coupling device comprising a pipe section having a seat for the gasket of a hand coupling half section provided with the usual coupling flanges, a hand lever having locking flanges adapted to coöperate with the coupling flanges and operated by said lever for coupling the hand coupling to said pipe section.

3. In an interchange coupling device, the combination with a pipe section connected to an automatic pipe coupling half section and an ordinary hand operated coupling half section connected to a train pipe and adapted to couple with said pipe section, of a lever and locking flanges operated by the movement of the lever for clamping the hand operated coupling into engagement with the pipe section.

4. In an interchange coupling device, the combination with a pipe section connected to an automatic pipe coupling half section and a hand operated coupling half section of the usual construction connected to a train pipe and adapted for connection with said pipe section, and with a hand operated coupling half section on an adjacent car, of a lever and locking flanges operated by the lever for locking the first mentioned hand operated coupling half section into coupling engagement with said pipe section.

5. An interchange coupling device comprising a pipe section adapted to form a coupling engagement with a hand operated coupling half section of the usual construction, a lever device adapted to couple said pipe section and coupling half section together and lugs on said pipe section adapted to engage the hand coupling half section to prevent movement of the parts in operating the lever device.

6. An interchange coupling device comprising a pipe section adapted to form a coupling engagement with a hand operated coupling half section, a lever device rotatably mounted on said pipe section for locking the parts into coupling engagement, a lug on the pipe section for holding the lever device in position, said lever device having a notch adapted in one position to register with the lug to permit the lever device to be assembled in its operating position.

7. An interchange coupling device comprising a pipe section adapted to form a coupling engagement with a hand operated coupling half section of the usual construction, a lever device rotatably mounted on said pipe section and provided with flanges adapted on operation of the lever device to engage the flanges of the hand coupling half section and clamp the parts into coupling engagement.

8. The combination with a hand operated pipe coupling half section of the type having opposite locking flanges, of a pipe section adapted to connect with said pipe coupling half section and having a flange, and a lever adapted to engage said flange and provided with locking flanges adapted to coöperate with the flanges of the coupling half section, whereby the rotative movement of the lever is adapted to lock the coupling half section and the pipe section together.

In testimony whereof I have hereunto set my hand.

ROBERT E. ADREON.

Witnesses:
N. F. NEIDULANDER,
FREDERICK G. WILLIAMSON.